United States Patent
Kindig

[15] 3,690,239
[45] Sept. 12, 1972

[54] PRINT STRIPPING MECHANISMS
[72] Inventor: Guilford Edwin Kindig, Rochester, N.Y.
[73] Assignee: Eastman Kodak Company, Rochester, N.Y.
[22] Filed: July 2, 1971
[21] Appl. No.: 159,320

[52] U.S. Cl. ..................................................95/13
[51] Int. Cl. ............................................G03b 17/52
[58] Field of Search ....................95/13, 14; 156/584

[56] References Cited

UNITED STATES PATENTS

| | | | |
|---|---|---|---|
| 3,424,072 | 1/1969 | Hodgson et al. | 95/13 |
| 3,446,134 | 5/1969 | Brown et al. | 95/14 |
| 3,589,904 | 6/1971 | Chen | 95/13 |

*Primary Examiner*—John M. Horan
*Assistant Examiner*—Alan A. Mathews
*Attorney*—W. H. J. Kline et al.

[57] ABSTRACT

The disclosure relates to photographic cameras adapted to use self-processing film units comprising preregistered, integral image-recording portions strippably coupled to individual rigid frames. Each film unit is processed by movement between a pair of opposed pressure members in the camera, and then the image-recording portion is separated from the frame and expelled from the camera by a novel stripping mechanism that engages the recording portion and presses it out of engagement with the frame.

10 Claims, 14 Drawing Figures

PATENTED SEP 12 1972 3,690,239

GUILFORD E. KINDIG
INVENTOR.

BY
ATTORNEYS

GUILFORD E. KINDIG
INVENTOR.

BY
ATTORNEYS

PRINT STRIPPING MECHANISMS

BACKGROUND OF THE INVENTION

The present invention relates to processing photographic cameras for use with self-processing film units wherein each film unit has an image-recording portion strippably supported on a carrier. More particularly, the invention relates to novel means for separating the image-recording portion of such film units from the carrier after exposure of the film unit and the initiation of its processing.

It is well known in the photographic arts to provide film units with materials for processing the units immediately after their exposure. Generally, such units include an image-recording portion comprising a photosensitive element, for supporting one or more layers of photosensitive material, and a process element or second sheet, adapted to be registered with the photosensitive element during processing. A viscous processing composition is supplied to the image-recording portion at one end thereof and is spread toward the other end by passing that unit between juxtaposed pressure-applying members for distributing the composition in a layer of predetermined thickness between the two elements. The distributed composition permeates the layers of the image-recording portion to effect development of the photosensitive layers, and an image is constructed in a mordant layer, in either of the photosensitive and process elements, to provide a substantially permanent visible photograph.

In a presently popular commercial film unit, generally referred to as being of the "peel-apart" type, the photosensitive and process elements are spaced apart during exposure and are superimposed for processing. The image-or print-receiving layer is in the process element, and that element is stripped from the rest of the film unit after processing to provide a positive right-reading print. Such a film unit is disclosed, for example, in U.S. Pat. Nos. 3,080,805 and 3,511,659.

The present invention is disclosed and has particular utility with different types of film units having image-recording portions that generally are referred to as being "preregistered" or "integral." The photosensitive and process elements of a preregistered image-recording portion are superposed or registered prior to exposure, while the same elements of an integral image-recording portion are maintained permanently in superposed or registered relation during and after processing. Such film units define a composite, permanently registered structure that is designed to remain substantially in the same physical form during exposure and after processing. In the presently known film units of this type, the second element is transparent to permit exposure of the photosensitive materials from that side of the unit, and the image-or print-receiving layer is located to provide a positive image that need not be stripped from the rest of the unit for viewing. Specific details of film units employing this latter type of image-recording portions are disclosed, for example, in commonly assigned U.S. Pat. application Ser. No. 027,990, entitled PHOTOGRAPHIC FILM UNIT FOR DIFFUSION TRANSFER PROCESSING, filed Apr. 13, 1970 in the name of H. E. Cole, and now abandoned, and in French Pat. Nos. 2,006,255 and 2,006,256 published Dec. 26, 1969.

To facilitate film handling and manipulation, especially in a photographic processing camera, an integral image-recording portion or unit of the type just described can be coupled to a substantially rigid but somewhat flexible plastic frame, that also carries a container of processing composition and an excess-fluid trap, respectively, for supplying a processing composition to one end of the image-recording portion and for collecting any excess of the composition from the opposite end. The image-recording portion is releasably or strippably coupled to one side of the frame and is exposable through an aperture in the frame from the opposite side thereof. The pod and trap, on the other hand, are permanently attached to the frame and are adapted to remain therewith after separation of the recording unit therefrom. A film unit of this type is disclosed, for example, in commonly assigned, copending U.S. application Ser. No. 111,403, entitled FILM UNIT, filed Feb. 1, 1971 in the name of D. M. Harvey.

A camera for use with rigid-frame film units is disclosed, for example, in commonly assigned, copending U.S. Pat. application Ser. No. 111,472, entitled STRIPPING MECHANISM, filed on Feb. 1, 1971 in the name of D. M. Harvey. As disclosed in that application, one or more stripping or skiving fingers can be configured to enter between the image-recording portion or unit and the confronting surfaces of the frame after processing has been initiated to separate the recording unit from the frame and from the pod and trap. The skiving or stripping fingers themselves comprise a pair of pointed blades that are adapted to enter shallow grooves formed in the lateral edge portions of the frame as the latter is moved relative to the camera. These grooves are located to guide and permit movement of the fingers under the marginal edge portions of the image-recording unit, between that unit and the frame, for progressively separating the print with a wedging action.

The above-mentioned stripping mechanism is fully satisfactory for its intended purpose, but does demand accurate three-dimensional positioning of the frame relative to the stripping fingers to ensure that the latter properly enter the narrow rail slots and penetrate beneath the margins of the image-recording unit. Additionally, the permissible locations of such stripping fingers are somewhat limited. For example, at least where stripping occurs during movement of the film unit back towards the film pack, the fingers generally must be located on the same side of the frame as the print, and this tends to increase the thickness of the camera back or cover door.

SUMMARY OF THE INVENTION

A principal object of the present invention is to provide a stripping mechanism and a processing camera for separating an image-recording portion of a self-processing film unit from other elements of the unit that have little utility after processing has been initiated.

Another object of the invention is to provide a processing camera with simple and reliable means for automatically stripping an image-recording portion of a self-processing film unit from a rigid frame without recourse to unduly complex or delicate mechanisms.

Still another object of the invention is to provide improved stripping mechanisms of the above types that are adaptable to uses and arrangements not possible with previously known mechanisms.

Briefly, these and other related objectives are accomplished in accordance with the preferred embodiment of the invention by providing a processing camera with a print-stripping member that engages the image-recording portion of a self-processing film unit through the exposure aperature of a substantially rigid print-mounting frame, preferably as the latter is being moved relative to the camera. The stripping member pushes the recording portion from the frame, beginning at one end and proceeding to the other end in response to the movement of the frame relative to the camera. Simultaneously therewith, and beginning at the end first disengaged, the image-recording portion or print is directed by the stripping member through an appropriate opening in the camera housing so that the finished print is ejected automatically from the camera or to a position accessible from the camera exterior. The stripping member can be relatively large and correspondingly rugged, and need not be aligned with the frame to a high degree of accuracy in order to perform properly. Moreover, it can operate from the side of the frame opposite to the recording portion, and can be located in any number of positions to conserve camera space.

Various means for practicing the invention and other advantages and novel features thereof will be apparent from the following detailed description of an illustrative preferred embodiment of the invention, reference being made to the accompanying drawings in which like reference numerals denote like elements.

DESCRIPTION OF THE PREFERRED EMBODIMENT

Because self-processing cameras and film units are well known, the present description will be directed in particular to elements forming part of or cooperating directly with the present invention. Elements not specifically shown or described herein should be understood as being selectable from those known to persons skilled in the art.

By reference to FIGS. 1 through 4 of the drawings, a typical preregistered and integral film unit 21 of the type described above will be seen to comprise a frame 22; an image-recording portion or unit 23, including a photosensitive element or first sheet 24 and a process element or second sheet 25; a container or pod 26 of processing composition, and a trap or collector cover 27 for any excess of the composition. The frame 22 is preferably made of an opaque, generally rigid but somewhat flexible, plastic material and includes two lateral side rails 28 joining a trap or trailing end bar 29 and a pod support or leading end bar 31, all of which cooperate to define an exposure aperture in the frame. As disclosed in the above-identified U.S. Pat. application Ser. No. 111,403, entitled FILM UNIT, the faces of the frame can also include mating longitudinal ribs and recesses which cooperate in an assemblage of stacked film units to allow only longitudinal sliding motion between those units and to provide a light seal along the edges of the assemblage. For purposes of the present disclosure, however, such cooperating ribs and recesses have been omitted from the illustrative film units inasmuch as that feature is not necessary to practicing or understanding the present invention.

As described in greater detail in the U.S. Pat. application just referred to, the photosensitive and process sheets 24 and 25 of the image-recording unit 23 preferably are rectangular and coextensive with one another, and are secured in registered or superposed facing relation by an appropriate seal or connection, preferably along the lateral edges thereof. In this manner, the two sheets are secured substantially in direct contacting relation along their marginal edges but may be resiliently separated in their central areas to permit the distribution of a processing composition therebetween. Similarly, the two sheets are resiliently separable at their leading and trailing ends 33 and 32, respectively, to permit the introduction of the processing composition between the sheets at their leading ends and the collection of any excess composition from between the sheets at their trailing ends.

Figure 4:
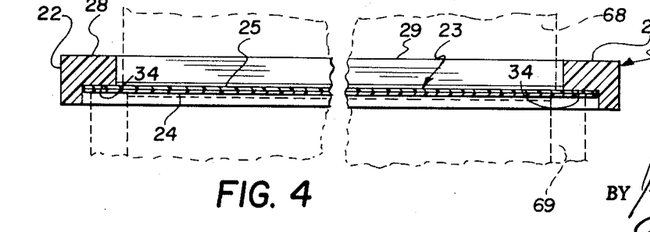
FIG. 4 is a cross-sectional end elevational view of the film unit shown in FIGS. 1 and 2, taken along line 4—4 of FIG. 1.

As best shown in FIG. 4, the side rails of the frame are notched along their reverse faces to provide recessed support surfaces 34 to which the marginal edges of the image-recording unit are coupled, preferably by a strippable or relatively weak adhesive material. Similarly, the reverse face of the frame, ahead of the leading end of the image-recording unit, defines a shallow compartment 35 that accommodates and protects the pod 26 of processing composition.

Figure 1:
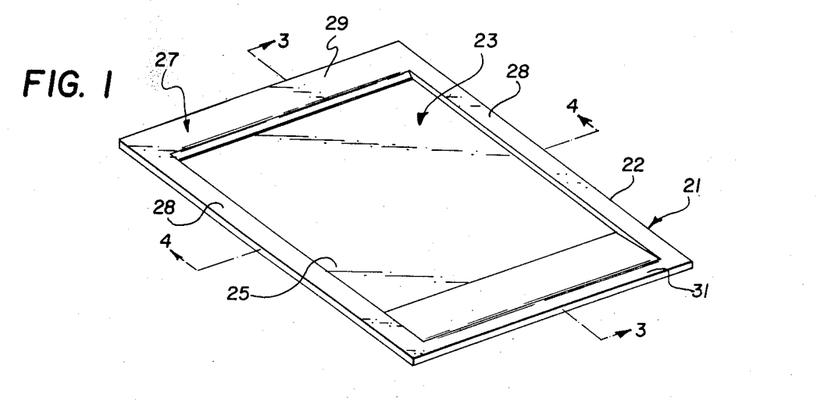
FIG. 1 is a perspective view of the exposure face of a preregistered, integral film unit of the type with which the present invention is concerned.
Figure 2:
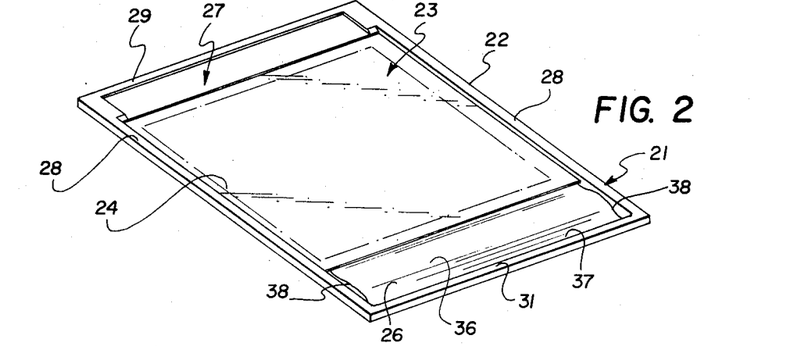
FIG. 2 is a perspective view of the reverse face of the film unit shown in FIG. 1.
Figure 3:
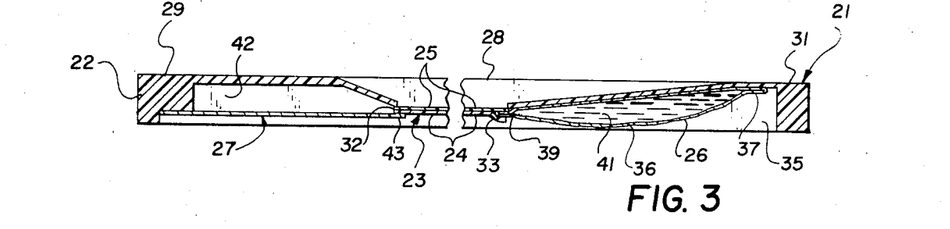
FIG. 3 is a cross-sectional side elevational view of the film unit shown in FIGS. 1 and 2, taken along line 3—3 of FIG. 1.

The pod itself may include one or more parts that cooperate to define a suitable supplying mechanism, and preferably includes a rupturable containing part 36 that is folded along its leading end 37 and is securly sealed along its side edges 38. The trailing end 39 of the pod is provided along substantially its entire length with a rupturable seal adapted to release a processing fluid composition 41 from the container upon the application of hydraulic forces generated by passing the container between a pair of juxtaposed pressure-applying members, as described below. The containing part of the fluid supplying mechanism is permanently cemented or otherwise joined to the frame 22 and cooperates with the leading end of the recording unit in a manner suitable for discharging the processing composition between the photosensitive sheet and the process sheet. For example, in the illustrative film units, the container or pod is illustrated with its trailing discharge end or funnel inserted into a space or slot provided between the photosensitive sheet and the process sheet at the leading edge of the image-recording portion.

The trap bar at the trailing end of the frame is provided with a shallow, rearwardly facing recess 42 covered by vapor-impermeable trap cover sheet 27. The cover sheet is cemented or otherwise permanently attached to the frame and overlies the trailing end of the image-recording portion to direct any excess of the processing fluid from the trailing end of the image-recording portion and into the trap.

Figure 5:
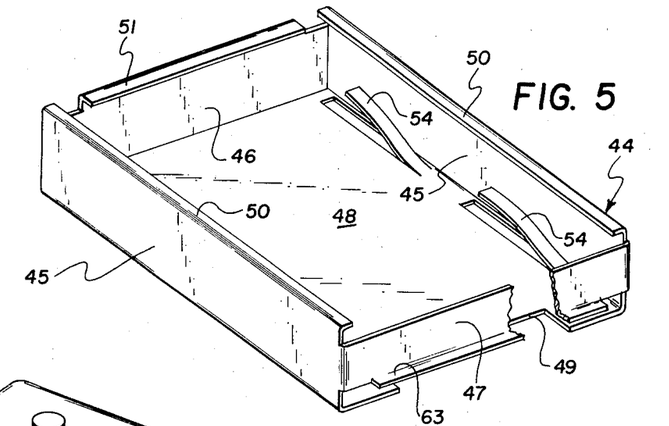
FIG. 5 is a perspective view of a film pack casing adapted to receive a plurality of film units of the type shown in FIGS. 1 through 4.
Figure 6:
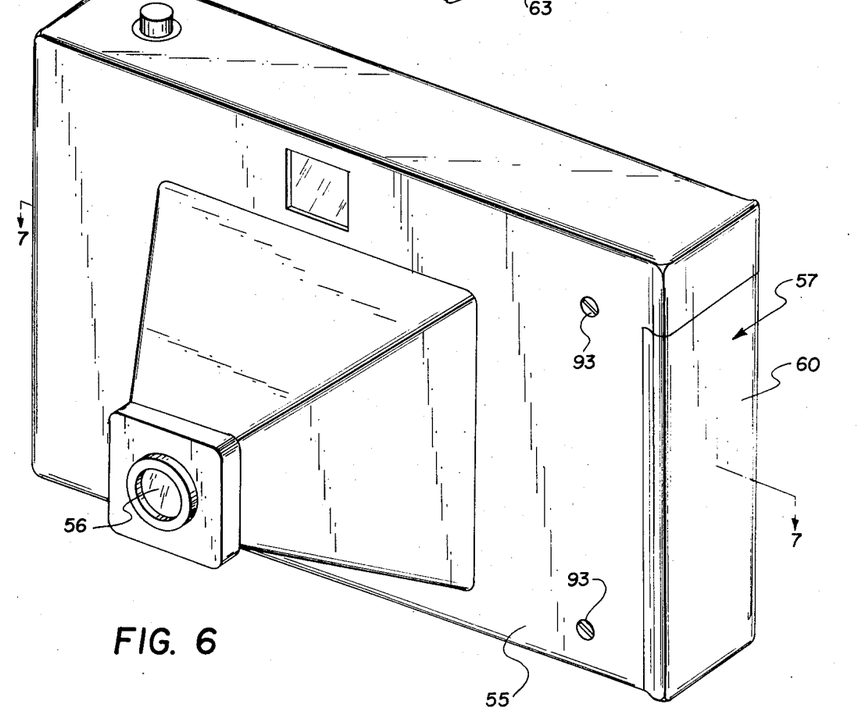
FIG. 6 is a perspective front view of an illustrative camera comprising the preferred embodiment of the present invention.

The film units described above are preferably supplied in a film pack comprising a plurality of such units held together by a clip or cartridge casing 44, best shown in FIG. 5. The casing is made of plastic or sheet metal and comprises side walls 45, a trailing end wall 46, a partial leading end wall 47 and a rearward wall 48 provided with a rectangular opening 49 at the leading end of the casing. Lateral retaining lips 50 project inwardly from the forward edges of the side walls and a similar end retaining lip 51 likewise projects inwardly from the forward edge of end wall 46.

Figures 7, 8, 9:
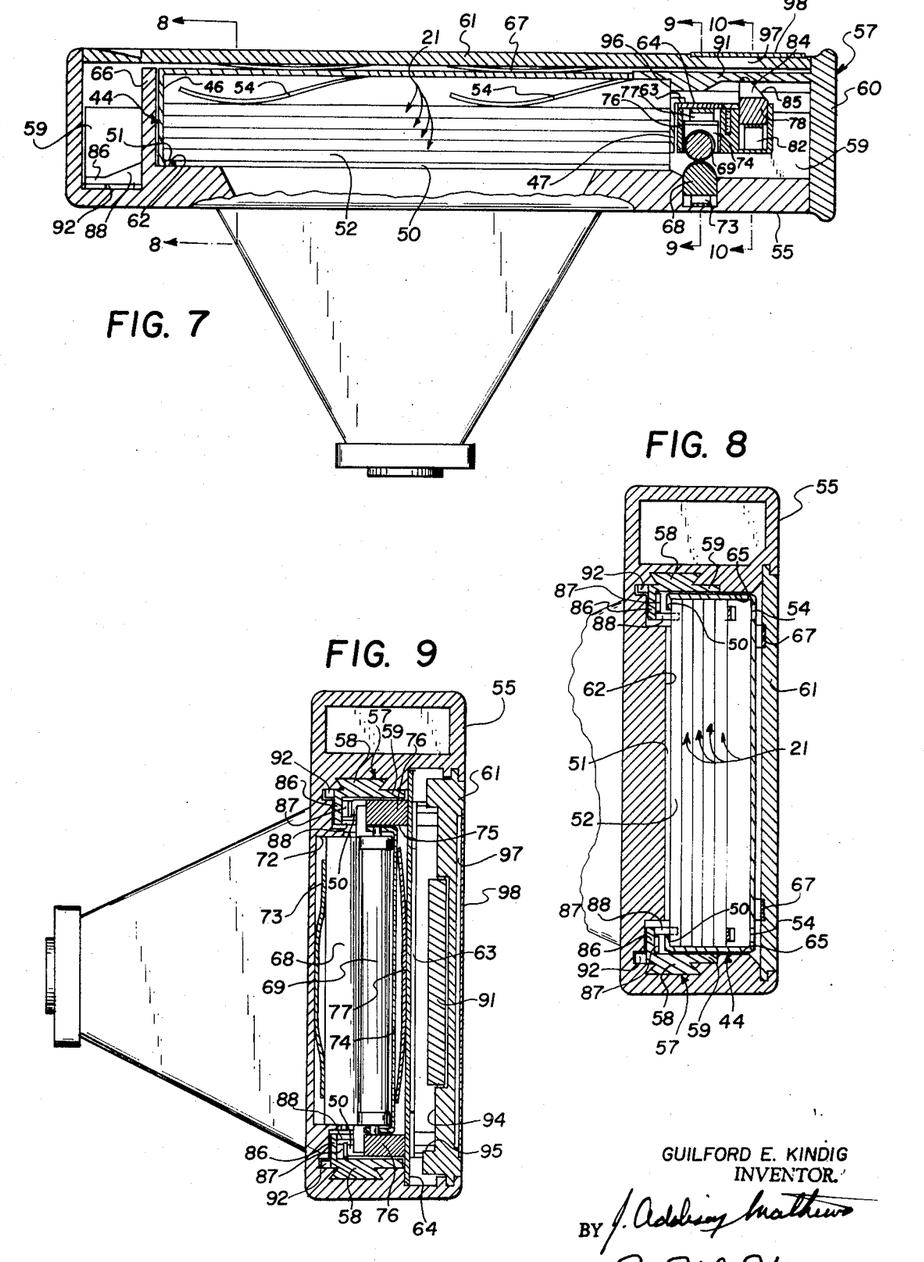
FIG. 7 is a partially cross-sectioned plan view of the camera shown in FIG. 6, taken along line 7—7 of FIG. 6.
FIG. 8 is a partially cross-sectioned end elevational view of the camera shown in FIGS. 6 and 7, taken along line 8—8 of FIG. 7.
FIG. 9 corresponds to FIG. 8 but is taken along line 9—9 of FIG. 7.

FIGS. 7 and 8 illustrate a fully loaded film pack which is depicted as comprising a film unit assemblage including four film units 21 and a mask member 52. The mask member is simply an opaque plastic plate of the same exterior dimensions as the film units and serves to protect those units from ambient light and dust before the film pack is loaded into the camera. Four leaf springs 54 are formed integrally with the rearward wall 48 of the film pack casing and bias the film unit assemblage forwardly into contact with lips 50 and 51 at the front of casing 44. Because end wall 47 is narrower in a forward-to-rearward direction than the film pack casing, it will be seen that the forwardmost element of the film unit assemblage can be slid out of the leading end of the film pack and can be returned to the film pack by being inserted into the casing between end wall 47 and rearward casing wall 48. Further details of such a film pack are described and illustrated in commonly assigned, copending U.S. Pat. application Ser. No. 111,466, entitled FILM CARTRIDGE AND ASSEMBLAGE and filed Feb. 1, 1971 in the name of D. M. Harvey.

The illustrative camera shown in FIGS. 6 through 14 comprises a housing 55 provided with a conventional lens 56 and a shutter mechanism, not shown. As described in greater detail below, a drawer or frame transporter 57 is slidably carried within the camera housing by means of dovetail slides 58 extending along the drawer side walls 59 and received in mating grooves in housing 55. One end wall 60 of the drawer is accessible from the exterior of the camera and is adapted to be grasped to allow the drawer to be slid manually between its open and closed positions shown respectively in FIGS. 12 and 7. The camera housing also includes a slidably supported loading door 61 that can be slid open after the drawer 57 has been moved to its open position.

To install the film pack in the camera, the drawer and the loading door are opened and the film pack is inserted into the interior of the camera housing as best illustrated in FIGS. 7 and 8. In this position the forward lip 51 of the film pack casing is in contact with a rearwardly facing positioning surface 62 of the camera housing, and an end lip 63 along the rearward edge of casing wall 47 is similarly in contact with the rearwardly facing surface of a rigid internal support bar 64 mounted in the camera housing behind the side walls 59 of the drawer. The side walls 45 of the film pack casing are straddled by guide surfaces 65 integral with the camera housing, and the respective film pack end walls 46 and 47 are likewise straddled by locating tongue 66 of the housing and by support bar 64. When the loading door is closed, a pair of leaf springs 67 on that door engage the rearward wall 48 of cartridge casing 44 and resiliently seat the film pack against surface 62 and support bar 64, thereby accurately establishing the position of the film pack with respect to the camera lens so that the emulsion surface of a film unit in exposure position in the film pack is coincident with a focal plane of the camera lens.

Figure 13:
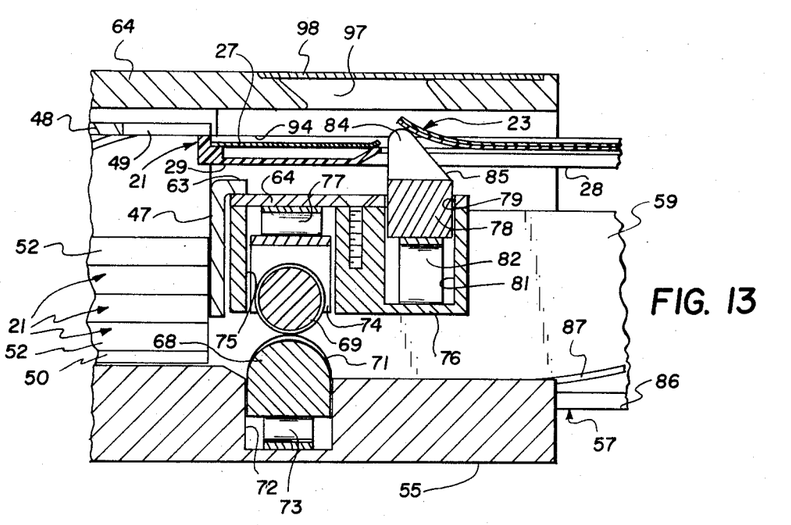
FIG. 13 is an enlarged cross-sectional view corresponding to a portion of FIG. 12 and showing the stripping member as it commences to separate an image-recording unit from a film unit frame.
Figure 14:
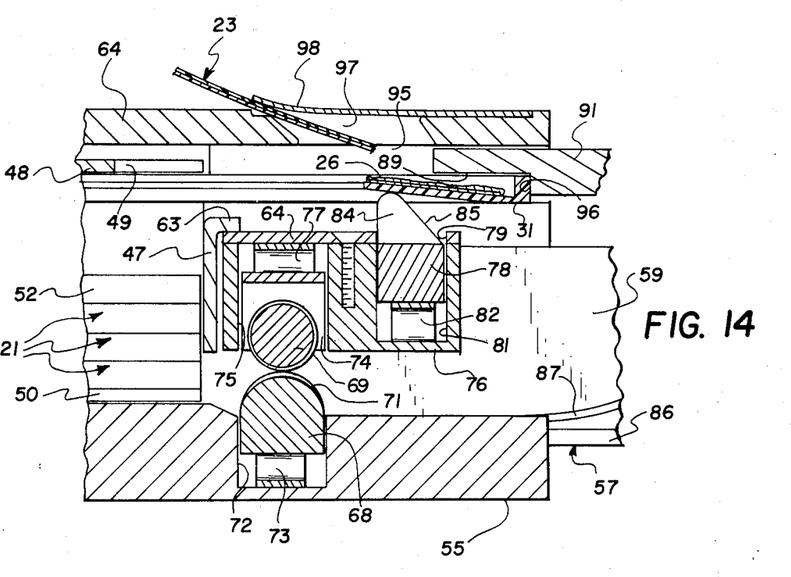
FIG. 14 corresponds to FIG. 13 but depicts the stripping member at the completion of the separation of the image-recording unit from the frame.

The pressure-applying members of the illustrative camera, which are most clearly depicted in FIGS. 9 and 13, comprise a forward pressure bar 68 and a rearward pressure roller 69. The forward pressure bar is provided with an arcuate rearward face 71 and is partially received in a slot 72 in the camera housing. A leaf spring 73 is compressed between the bottom of the slot and the rearward face of the pressure bar to urge the latter rearwardly. Roller 69 is rotatably carried in a U-shaped metal bracket 74 that in turn is received in a rectangular opening 75 in support block 76 mounted on the previously mentioned support bar 64. A leaf spring 77, compressed between bracket 74 and support bar 64, urges the roller forwardly toward pressure bar 68, with which it is aligned. Accordingly, it will be seen that the two pressure members are urged toward resilient contact with one another by springs 73 and 77 to provide a pressure nip in endwise alignment with the forwardmost unit in the film pack.

Stripper bar 78, projects rearwardly through an opening 79 (FIG. 10) in support bar 64 and extends in the opposite direction into a rectangular opening 81 in support block 76. A leaf spring 82 in the opening 81 behind the stripper bar urges the latter rearwardly to the position shown in FIGS. 7, 10 and 13. End ears 83 on the stripper bar extend beyond the corresponding ends of support bar opening 79 and engage that bar to limit the rearward movement of the stripper bar. As shown at numeral 84, the stripper bar is provided with a pair of rearwardly projecting stripper fingers provided with sloping faces 85 best depicted in FIGS. 13 and 14. As described in detail below, these fingers are adapted to be received through the frame exposure aperture and between its side rails to effect separation of the image-recording unit from the film unit frame.

Figures 10, 11:
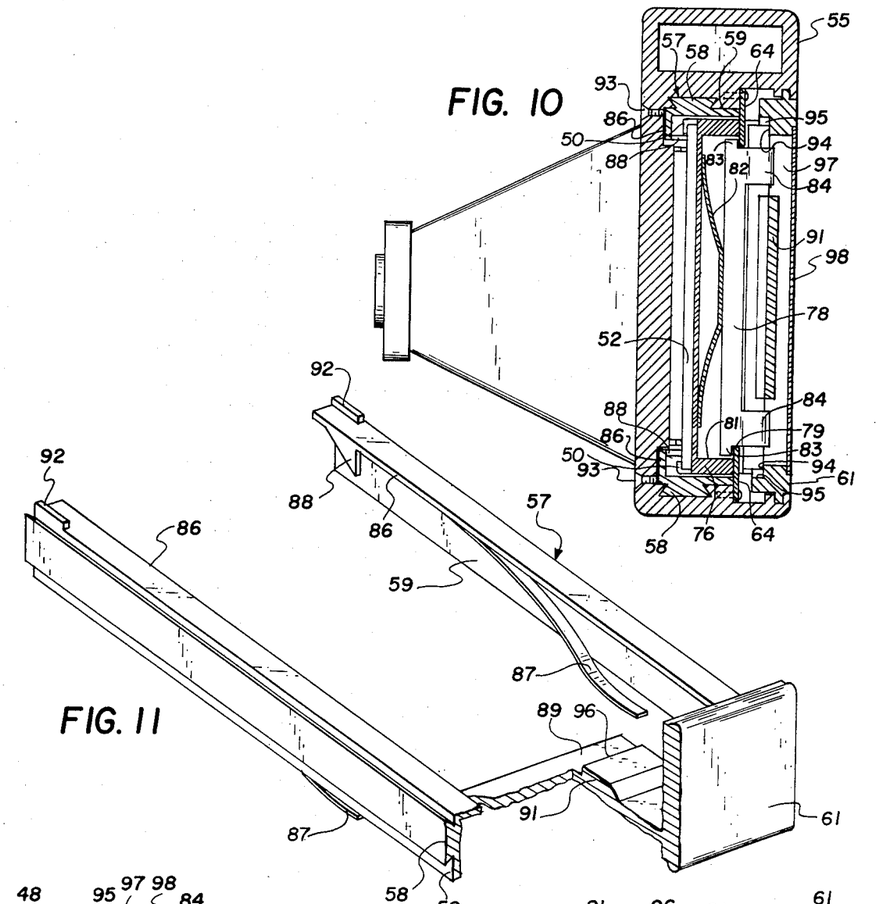
FIG. 10 corresponds to FIGS. 8 and 9 but is taken along line 10—10 of FIG. 7.
FIG. 11 is a perspective view, partially cut away, of the camera's frame transporter or drawer removed from the camera housing.
Figure 12:
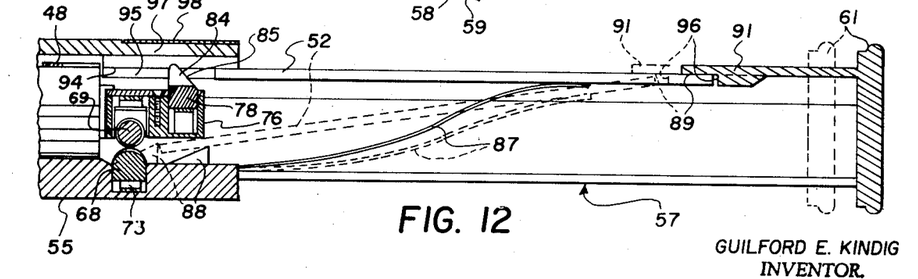
FIG. 12 corresponds to a portion of FIG. 7 and shows the camera drawer in its open position.

By reference to FIGS. 8 through 10, it will be apparent that the side walls 59 of drawer 57 are located adjacent to but out of contact with the film pack loaded into the camera. Along their forward edges, the drawer side walls are provided with inwardly facing lips or ribs 86 which lie forwardly of the film pack lips 50 when the drawer is in its closed position. Each rib 86 is provided with a light leaf spring 87 (FIG. 11) that is compressed between that rib and the adjacent film pack lip 50 when the drawer is closed. Because of the relative weakness of springs 87 compared to door springs 67, the former springs have no effect on the accurate positioning of the film pack within the camera housing. Toward their trailing ends, the drawer ribs 86 are provided with rearwardly projecting hooks 88 adapted to engage the trailing edge of the forwardmost unit in the film pack between edge lips 50 and end wall lip 51 of casing 44.

After a new film pack has been loaded into the camera, the initial opening movement of the drawer causes hooks 88 to engage the trailing edge of the forward mask member 52 and to slide the latter out of the film pack forwardly of casing end wall 47. The leading end of the mask member enters between the pressure applying members by forcing them apart in opposition to the resilient influence of springs 73 and 77. By reference to FIG. 9, it will be seen that hooks 88 are located beyond the ends of pressure bar 68 so that they can push the mask member completely through and past the pressure nip. As the drawer is opened, the free ends of leaf springs 87 move beyond the film pack lips 50 and into engagement with the margins of the mask member. By the time the drawer reaches the almost completely open position shown in broken lines in FIG. 12, the trailing end of the mask member 52 has moved past the pressure nip and rests on support block 76 and springs 87 have tilted that member rearwardly so that its leading edge rests against forwardly facing surface 89 of the drawer's partial rear wall member 91. The fully open position of the drawer is illustrated in solid lines in FIG. 12 and is established by the abutment of lugs 92 (FIG. 11) at the trailing ends of the drawer side bars with stop screws 93 shown in FIG. 10. The completion of the drawer opening movement causes hooks 88 to move the trailing edge of the forward mask member beyond the edge of support block 76, whereupon the resilient force of springs 87 causes the trailing edge of that member to move rearwardly into contact with marginal support surfaces 94 on the cover door. In this position, the rearward face of the mask member is coplanar with the inner surface of the rearward casing wall 48 and the edges of its trailing end are located between converging lateral guide surfaces 95 defined by the door.

As the closing movement of the drawer commences, the leading edge of the forward mask member is engaged by a shoulder 96 of drawer wall member 91, which drives mask member 52 toward the film pack casing. When the trailing edge of the mask member encounters the sloped faces 85 of the stripper fingers, the stripper bar is cammed forwardly so that it rides on the forward face of the mask member. Through the cooperation of marginal support surfaces 94 and guide surfaces 95, which converge toward the film pack casing, the trailing edge of mask member 52 is then directed into the casing behind the rearwardmost film unit.

When the drawer has reached its closed position, shoulder 96 has moved the forward mask member completely into the film pack casing beyond casing wall 47, whereupon springs 54 move that member forwardly into contact with the rearwardmost film unit. During the closing movement of the drawer, the hooks 88 on the drawer lips engage the side rails of the forwardmost film unit and temporarily displace the latter rearwardly by overcoming the biasing influence of springs 54. However, because of the spacing provided between the rearward film unit and the rearward edge of casing wall 47, the temporary rearward displacement of the film units does not interfere with the movement of the forward mask member back into the film pack casing.

When the drawer is completely closed, hooks 88 are located beyond the trailing edge of the forwardmost film unit, which is then properly positioned for exposure. After such exposure has been completed, the subsequent opening and closing of the drawer moves that film unit between the pressure rollers and then returns it to the film pack as just described in connection with the forward mask member. Thus, it will be apparent that each film unit, in turn, can be exposed and processed.

The movement of each film unit between the pressure members causes roller 69 to rupture the seal at the edge of the processing pod received between the two sheets of the image-recording unit and to extrude processing fluid between those sheets. As the sheets themselves then pass between the pressure members, the processing fluid is uniformly distributed between them to initiate development of the photographic image. As shown in FIGS. 4 and 9, roller 69 is preferably stepped to provide a smaller central portion which defines the thickness of the layer of fluid distributed between the sheets. Excess processing fluid is discharged from the trailing end of the image-recording unit and is received in the collector chamber or trap defined by recess 42 and cover 27. Further details of the processing operation are disclosed in the previously mentioned U.S. Pat. application Ser. No. 111,403, entitled FILM UNIT, filed on Feb. 1, 1971 in the name of D. M. Harvey.

During the closing operation of the drawer, the trailing edge of the film unit passes the stripper bar by camming the latter forwardly as previously described. When the trap bar 29 of the film unit moves beyond the two stripper fingers, the latter move rearwardly through the frame exposure aperture and between the side rails of the frame to engage the face of the image-recording unit with sufficient force to separate it from those rails and from the corresponding edge of the trap member. The trailing edge of the image-recording unit is therefore displaced to the position shown in FIG. 13 and is directed into a slot 97 in the loading door. Continuing closing movement of the drawer causes the trailing end of the recording unit to pass through slot 97 by displacing the flexible closure flap 98 covering the slot. When the pod support bar 31 of the film unit has reached the stripper fingers, the processed image-recording unit is separated completely from the frame member and the pod and trap thereof and is temporarily held in slot 97 by flap 98. The final closing movement of the drawer then cams the stripper bar forwardly in the manner shown in FIG. 14 so as to allow the pod support bar to pass beyond the stripper fingers as the film unit frame and its trap and pod are returned into the film pack casing.

It should now be apparent that an improved processing camera and stripping mechanism has been provided for use with self-processing film units, particularly preregistered, integral film units including an image-recording portion strippably coupled to a rigid frame. The stripping mechanism operates through an exposure or other aperture from the side of the frame opposite to the supported image-recording portion and separates the recording portion from the frame by pushing one away from the other. The mechanism is rugged, yet reliable, and can be located in a number of appropriate locations for conserving camera space.

The invention has been described in detail with particular reference to the preferred embodiment thereof, but it will be understood that variations and modifications can be effected within the spirit and scope of the invention.

I claim:

1. A photographic camera adapted to effect an exposure and processing of a self-processing film unit, the film unit including an image-recording element and a substantially rigid frame defining first and second sides and an exposure aperture, the image-recording element being strippably coupled to the first side for exposure through the aperture from the second side, said camera comprising:
    means for locating the film unit in a position for the exposure;
    means for initiating the processing of the film unit; and
    a stripping mechanism for separating the image-recording element from the frame after the processing has been initiated, said mechanism including means defining an abutment surface for supporting the frame from the first side, a stripping member for engaging the image-recording element through the aperture from the second side, and means for applying forces to the image-recording element and the frame for separating the image-recording element from the frame.

2. A photographic camera adapted for use with a plurality of self-processing film units, each having an image-recording element releasably supported by a substantially rigid frame, the frame defining a first side supporting the element, a second side opposite to the first side, and an aperture extending from the first side to the second side, said camera comprising:
    means defining a first chamber for receiving the plurality of film units and for locating one film unit thereof in a position suitable for a photographic exposure;
    means for effecting the photographic exposure of the one film unit;
    a processing mechanism for initiating processing of the one film unit after the photographic exposure thereof;
    a transporting mechanism including means for moving the one film unit, after the photographic exposure thereof, from said first chamber, through said processing mechanism, to a final location; and
    a stripping mechanism for separating the element of the one film unit from the frame of that unit upon movement of the one film unit to said final location, said stripping mechanism including a guiding member having a surface defining substantially a single plane, for engaging the frame of the one film unit and for directing movement of that frame along a substantially straight path, and a stripping member resiliently urged toward a first position wherein said stripping member extends beyond said plane from one side thereof for engaging the element of the one film unit through the aperture in the frame of that unit and for pushing the element away from the frame to release the element from the frame, said stripping member being movable to a second position wherein said stripping member is located entirely to said one side of said plane for permitting movement of the frame along said substantially straight path.

3. The camera claimed in claim 2 further comprising a second chamber for receiving the frame of the one film unit after the element of that unit has been released from the frame by said stripping mechanism, and wherein said transporting mechanism further includes means for moving the fame into said second chamber.

4. In a photographic camera adapted to expose and initiate processing of a self-processing film unit including a substantially rectangular and flexible image-recording portion supported by a substantially rectangular and rigid frame defined by spaced end bars and spaced side rails, the camera including a stripping member and means for effecting endwise movement of the film unit along a first path extending toward and past the stripping member, an improvement comprising:
    means for guiding movement of one of the film unit and the stripping member relative to the other of the film unit and the stripping member along a second path extending toward and across the first path from a first position outside the first path, permitting the end bars to be moved along the first path past the stripping member, to a second position in the first path, permitting the stripping member to be disposed between the end bars in engagement with the image-recording portion; and
    means for applying a force to the image-recording portion through the stripping member when said one of the film unit and the stripping member is in the second position to effect a progressive separation of the image-recording portion from the frame as the image-recording portion is moved along the first path past the stripping member.

5. The improvement claimed in claim 4, the frame defining a first side on which the image-recording portion is supported, a second side, and an exposure aperture through which the image-recording portion is adapted to be exposed from the second side, wherein when said one of the film unit and the stripping member is in the second position the stripping member extends from the second side through the exposure aperture and beyond the first side to displace the image-recording portion from the first side.

6. The improvement claimed in claim 4 wherein the means for effecting endwise movement of the film unit along the first path includes frame guiding surfaces defining the first path as a substantially straight path extending toward and past the stripping member for guiding the frame along the substantially straight first path, and wherein said means for guiding movement of one of the film unit and the stripping member relative to the other of the film unit and the stripping member along the second path includes a mounting structure supporting the stripping member for movement along the second path in a direction substantially perpendicular to the first path.

7. The improvement claimed in claim 4 wherein said means for applying a force includes a spring element resiliently biasing the stripping member toward the first path.

8. The improvement claimed in claim 4 wherein the stripping member includes a pair of spaced blunt fingers for engaging the image-recording portion adjacent to the side rails.

9. The improvement claimed in claim 7 wherein the stripping member includes a sloped abutment surface configured to engage the end bars for camming the stripping member out of the first path in opposition to the biasing influence of said spring element.

10. The improvement claimed in claim 4 further comprising means defining an exit opening including a guide surface for guiding the image-recording portion away from the frame and outside the camera as the image-recording portion is progressively separated from the frame.

* * * * *